United States Patent
Biskeborn

(10) Patent No.: US 7,894,161 B2
(45) Date of Patent: Feb. 22, 2011

(54) TAPE HEAD ASSEMBLY HAVING A SINGLE BEAM AND MULTIPLE MODULES COUPLED TO THE BEAM

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 11/680,789

(22) Filed: Mar. 1, 2007

(65) Prior Publication Data

US 2008/0212232 A1    Sep. 4, 2008

(51) Int. Cl.
G11B 5/48    (2006.01)

(52) U.S. Cl. .................................. 360/130.21; 360/129

(58) Field of Classification Search .................. 360/121, 360/122, 316, 130.21, 129
See application file for complete search history.

(56) References Cited

U.S. PATENT DOCUMENTS

| 2,868,889 | A | * | 1/1959 | Patterson .................... 360/122 |
| 3,495,049 | A | * | 2/1970 | Nelson et al. ............... 360/122 |
| 3,737,582 | A | * | 6/1973 | DeMoss ..................... 360/122 |
| 5,311,400 | A |   | 5/1994 | Fuchs et al. ................. 361/736 |
| 5,905,613 | A | * | 5/1999 | Biskeborn et al. ....... 360/130.21 |
| 6,392,840 | B1 |  | 5/2002 | Chen .......................... 360/126 |
| 6,580,586 | B1 |  | 6/2003 | Biskeborn .................... 360/319 |
| 6,606,219 | B2 | * | 8/2003 | Lam ............................ 360/129 |
| 6,771,456 | B2 |  | 8/2004 | Winarski et al. ......... 360/78.02 |
| 6,781,792 | B2 |  | 8/2004 | Biskeborn .................... 360/129 |
| 6,826,020 | B2 |  | 11/2004 | Daby et al. .................. 360/317 |
| 6,892,445 | B2 |  | 5/2005 | Biskeborn ..................... 29/729 |
| 2002/0181143 | A1 | | 12/2002 | Winarski et al. ......... 360/78.02 |
| 2003/0035248 | A1 | | 2/2003 | Daby et al. ................. 360/317 |
| 2003/0039069 | A1 | | 2/2003 | Biskeborn .................... 360/129 |
| 2003/0039077 | A1 | | 2/2003 | Biskeborn .................... 360/291 |
| 2004/0223248 | A1 | | 11/2004 | Dugas et al. .................. 360/48 |
| 2005/0057882 | A1 | | 3/2005 | Biskeborn .................... 361/291 |
| 2005/0128638 | A1 | | 6/2005 | Koeppe et al. .............. 360/125 |

FOREIGN PATENT DOCUMENTS

WO    WO 2004/102538 A2    11/2004

* cited by examiner

*Primary Examiner*—Craig A. Renner
*Assistant Examiner*—Tamara Ashford
(74) *Attorney, Agent, or Firm*—Zilka-Kotab, PC

(57) ABSTRACT

A tape head assembly according to one embodiment includes a single beam having an upper surface and a plurality of apertures into the upper surface, the beam defining a void positioned towards an inner portion thereof, the void being for receiving a cable; multiple modules coupled to the beam, at least one of the modules being coupled to the beam by members, the members extending into the apertures in the upper surface of the beam and being immovably coupled to the beam, each of the modules having at least one of readers for reading from a magnetic medium and writers for writing to a magnetic medium.

20 Claims, 14 Drawing Sheets

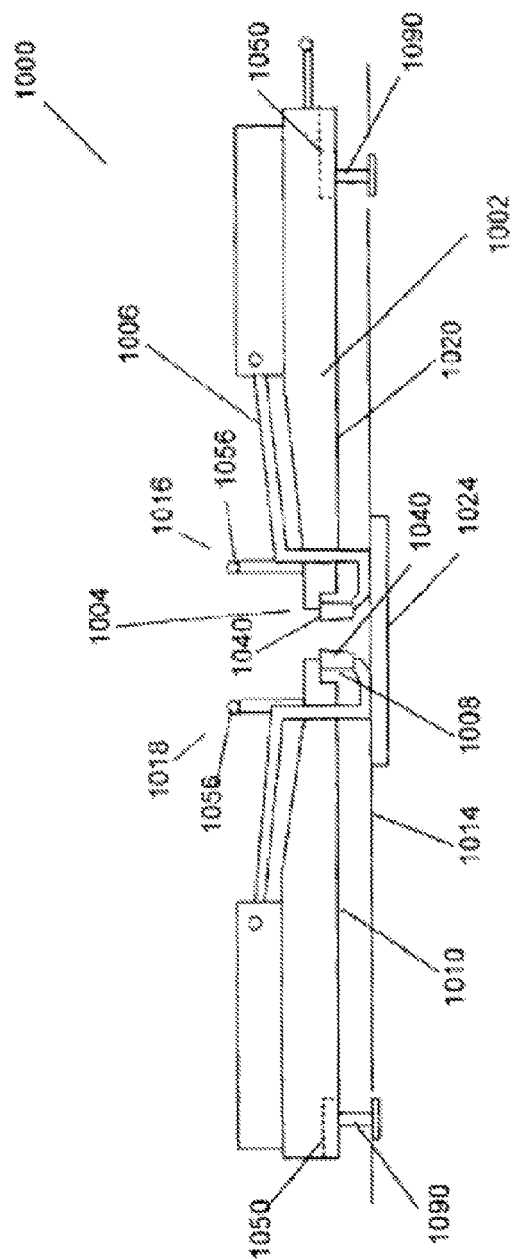
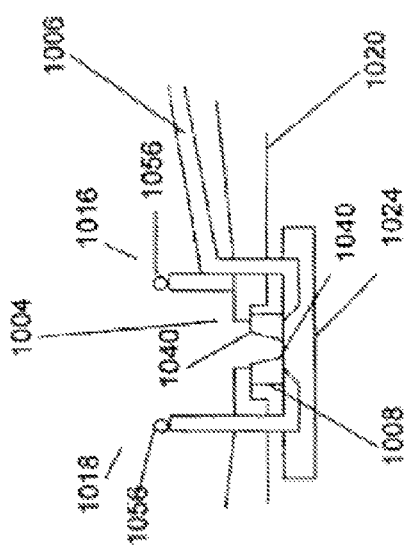
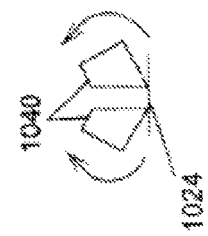

TAPE HEAD ASSEMBLY HAVING A SINGLE BEAM AND MULTIPLE MODULES COUPLED TO THE BEAM

FIELD OF THE INVENTION

The present invention relates to magnetic head structures, and more particularly, this invention relates to a magnetic head structure having multiple modules.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in hundreds of gigabytes on 512 or more data tracks.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$ defined between the tape 108 and a plane 111 in which the upper surface of the tape bearing surface 109 resides. It should be noted that the tape wrap angles $\alpha_i$, $\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. Moreover, a tape bearing surface length 112 is defined as the distance (in the direction of tape travel) between edges of the tape bearing surface 109. The wrap angles $\alpha_i$, $\alpha_o$ and tape bearing surface length 112 are often adjusted to deal with various operational aspects of heads such as that of Prior Art FIG. 1, in a manner that will soon become apparent.

During use of the head of FIG. 1, various effects traditionally occur. FIG. 2 is an enlarged view of the area encircled in FIG. 1 FIG. 2 illustrates a first known effect associated with the use of the head 100 of FIG. 1. When the tape 108 moves across the head as shown, air is skived from below the tape 108 by a skiving edge 204 of the substrate 104A, and instead of the tape 108 lifting from the tape bearing surface 109 of the module (as intuitively it should), the reduced air pressure in the area between the tape 108 and the tape bearing surface 109 allows atmospheric pressure to urge the tape towards the tape bearing surface 109.

As data density increases, gap-to-gap distance between the modules (gaps being where the elements are located) becomes more important. For example, in read-while-write operation, the readers on the trailing module read the data that was just written by the leading module so that the system can verify that the data was written correctly. If the data is not written correctly, the system will recognize the error and rewrite the data. However, the tape does not move across the tape bearing surfaces perfectly parallel to the tape guides. Rather, the tape may shift transversely by unequal amounts on each side of the head as it crosses the tape bearing surfaces, resulting in dynamic skew, or misalignment of the trailing readers with the leading writers. The effects of skewing are exacerbated as track density increases because the margin of error, defined as writer width minus reader width, decreases. And the farther the readers are behind the writers, the more chance that track misregistration will occur. If it does occur, the system may, for example, incorrectly believe that a write error has occurred.

Further exacerbating the misregistration problem is that stresses may develop during the module-joining process and these may disrupt track to track alignment and tape bearing surface planar alignments.

One approach currently being investigated by the present inventor is use of a three module tape head. A conventional alignment system would use a complex system of u-beams, that additionally require complex angular alignments. Furthermore, the resultant mass of the head assembly places greater demands on the head positioning actuator, which is a major consideration for future formats. In addition, such an alignment approach suffers from the same stresses that tend to disrupt track to track alignment and tape hearing surface planar alignments.

There is accordingly a clearly-felt need in the art for a tape head assembly having multiple modules, yet overcomes some or all of the drawbacks mentioned above.

SUMMARY OF THE INVENTION

A tape head assembly according to one embodiment includes a single beam having an upper surface and a plurality of apertures into the upper surface, the beam defining a void positioned towards an inner portion thereof, the void being for receiving a cable; multiple modules coupled to the beam, at least one of the modules being coupled to the beam by members, the members extending into the apertures in the upper surface of the beam and being immovably coupled to the beam, each of the modules having at least one of readers for reading from a magnetic medium and writers for writing to a magnetic medium.

A tape head assembly according to another embodiment includes a single beam; a first module coupled to the beam; a third module coupled to the beam; and a second module coupled to the beam at a position between the first and third modules, the first and third modules being coupled to the beam by members, the members extending into the beam and being immovably coupled to the beam.

A tape head assembly according to yet another embodiment includes a single beam; a first module coupled to the beam; a third module coupled to the beam; and a second module coupled to the beam at a position between the first and third modules, the second module being coupled to the beam by members, the members extending into the beam and being immovably coupled to the beam.

A tape drive system includes a head as recited above, a drive mechanism for passing a magnetic recording tape over the head, and a controller in communication with the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

FIG. 9A illustrates a side view of two module holders.

FIG. 9B shows the jaws of the two module holders straddling the clear surface.

FIG. 9C shows the modules being aligned as a result of the lifting of the rear ends of the module holders.

BEST MODE FOR CARRYING OUT THE INVENTION

Figure 1:
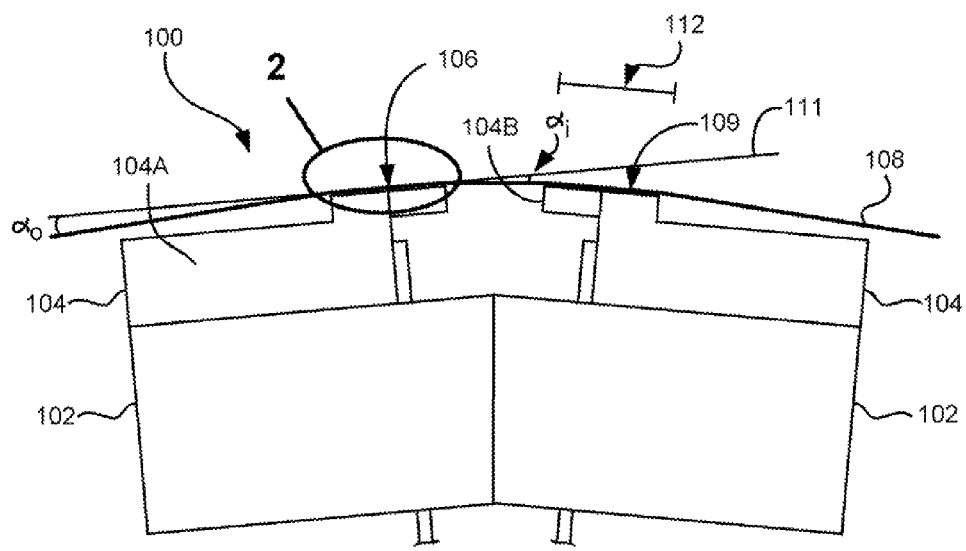
FIG. 1 illustrates a traditional flat-lapped magnetic tape head, in accordance with the prior art.
Figure 2:
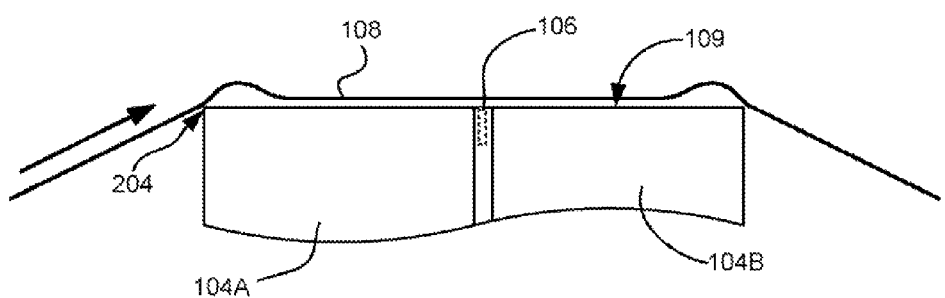
FIG. 2 is an enlarged view of Circle 2 of FIG. 1, showing a first known effect associated with the use of the head of FIG. 1.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described below disclose a new design in which multiple modules are easily aligned by use of a special beam and adjustable members that allow easy, accurate, and highly repeatable construction of multi-module tape heads. Some of the advantages that may be provided by some or all of the various embodiments are compact size, low module mass, fewer parts, simpler cables, fewer connections, write heads that may be nearly free of gap wear, read heads that are much more resistant to gap wear, etc.

Figure 3A:
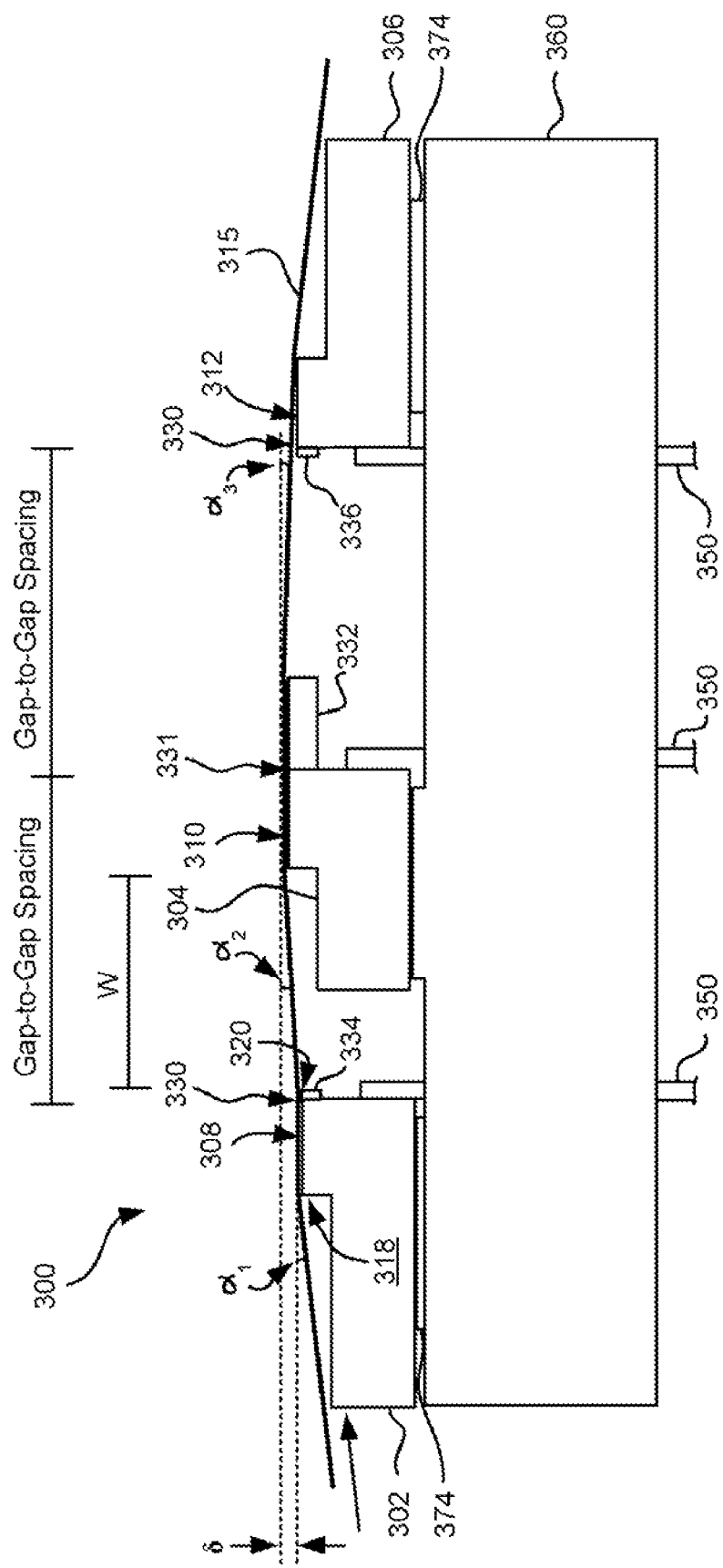
FIG. 3A is a side view of a magnetic tape head with three modules according to one embodiment where the modules all generally lie along parallel planes.

FIG. 3A illustrates a magnetic head assembly 300 according to one embodiment of the present invention that includes first, second and third modules 302, 304, 306 each having a flat profile tape bearing surface 308, 310, 312 respectively. Note that while the term "tape bearing surface" appears to imply that the surface facing the tape 315 is in physical contact with the tape bearing surface, this is not necessarily the case. Rather, it is more typical that a portion of the tape bearing surface is in contact with the tape, constantly or intermittently, while in other portions the tape rides above the tape bearing surface on a layer of air, sometimes referred to as an "air bearing". The first module 302 will be referred to as the "leading" module as it is the first module encountered by the tape in a multiple module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

In this embodiment, the tape bearing surfaces 308, 310, 312 of the first, second and third modules 302, 304, 306 lie on approximately parallel planes such that the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 3.12 lie along parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The inventor has found that the tape stays close to the tape bearing surface until close to the trailing edge 320 of the leading module 302. Accordingly, read and/or write elements 330 may be located towards the trailing edges of the outer modules 302, 306. These embodiments are particularly adapted for write-read-write applications.

A benefit of this and other embodiments described herein is that, fixing the tape bearing surfaces of the outer modules 302, 306 at a determined offset from the second module 304 automatically sets the inner wrap angle $\alpha_2$ when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.7° to about 1.1°, though can be any angle required by the design.

Beneficially, the inner wrap angle $\alpha_2$ will be slightly more on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note also that because the tape bearing surfaces 308, 312 of the outer modules 302, 306 are lower than the tape bearing surface 310 of the second module 304, a negative wrap angle is achieved at the trailing edge 320 of the leading module 302. This is generally beneficial in helping to reduce wear of the trailing edge 320, provided that proper consideration is given to the location of the crowbar region that forms in the tape where it peels off the head. The negative wrap angle also reduces flutter and scrubbing damage to the elements on the leading module 302. Further, at the trailing module 306, the tape 315 flies over the tape bearing surface 312 so there is virtually no wear on the elements. Particularly, the tape 315 entrains air and so will not significantly ride on the tape bearing surface 312 of the third module 306 (some contact may occur). This is permissible, because the leading module 302 is writing while the trailing module 306 is idle. These effects also reduce stiction and running friction between head and tape.

Writing and reading functions may be performed by different modules at any given time. In one embodiment, the second module 304 includes a plurality of data and optional servo readers 331 and no writers. The first and third modules 302, 306 include a plurality of standard writers 330 and no readers, with the exception that the outer modules 302, 306 may include optional servo readers. The servo readers are used to position the head during writing operations. The total mechanical gap for a writer module can be reduced to approximately 15 micrometers (or less) if the writers are not piggybacked on readers. Note that servo readers may have dummy writer poles for wear resistance. The reader mechanical gap can be reduced even further than that in the absence of piggybacked writers. For example, the readers of the second module 304 can be positioned in a gap, where the gap is less than about 12 microns thick, e.g., 5-12 microns, as measured parallel to a direction of tape travel thereover. These smaller gaps may exhibit less wear and reduced debris accumulation, and are more optimally configured for pre-recessing and carbon overcoating.

By having only readers or side-by-side writers and servo readers in the gap between the substrate and closure, gap lengths can be substantially reduced. Typical heads have piggybacked readers and writers, where the writer is formed above each reader. A typical gap is 25-35 microns. However, wider gaps promote tape irregularities drooping into the gap and causing gap erosion. Thus, the smaller the gap is the better The smaller gap enabled herein may exhibit fewer wear related problems.

Where each module has only readers or writers, subject to exceptions listed herein, the reader processing may be optimized and yielded independently of the writer processing (on a different module), and conversely. The servo readers may be omitted from the writers, depending on dynamic skew limitations. Alternatively, servo readers may reflect older technology (AMR) with wider gaps than data readers (GMR).

In some embodiments, the second module 304 has a closure, while the first and third modules 302, 306 have a thinner closure or no closure. Where there is no closure, preferably a thin film hard coating is applied during wafer processing and serves as a closure. Preferred coatings are plated nickel-iron (e.g. 45% nickel, 55% iron) and Sendust.

In the embodiment shown in FIG. 3A, the first, second, and third modules 302, 304, 306 each have a closure, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, are preferably shorter than the closure 332 of the second module 304 as measured parallel to a direction of tape travel over the respective module. This enables setting the modules closer together. One way to produce the shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 mm, which in some embodiments is ideal for stabilizing tape motion over the second module 304.

Figure 3B:
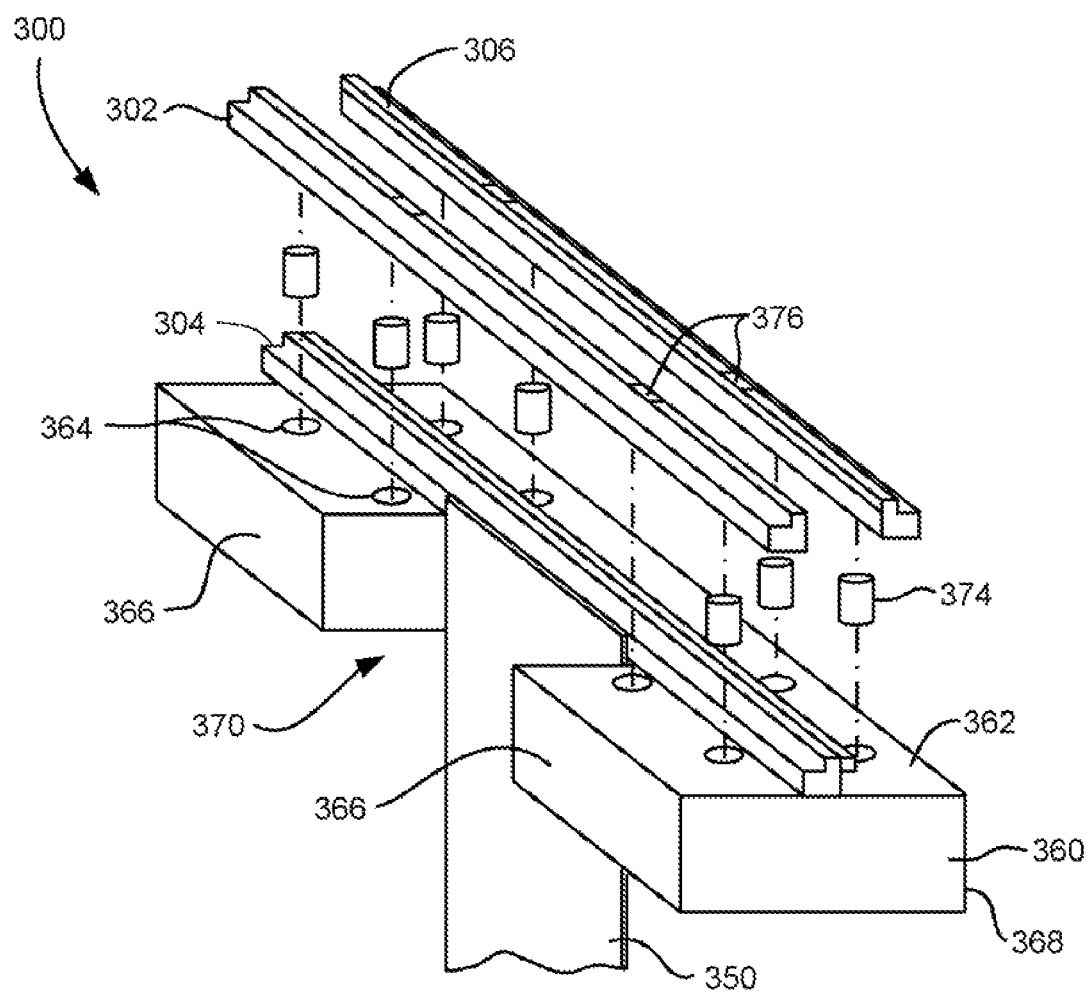
FIG. 3B is an exploded view of the magnetic tape head of FIG. 3A.

FIG. 3B illustrates, in an exploded view, one possible construction of the tape head assembly 300 of FIG. 3A. As shown, the assembly 300 includes a beam 360 having an upper surface 362 and a plurality of apertures 364 into the upper surface 362. The beam in this embodiment has a generally U-shape, with arms 366 extending from a rear portion 368, thereby defining a void 370 positioned towards an inner portion of the beam 360. The void is for receiving a cable 350 or cables. The cable 350 or cables may in turn be coupled to contact pads on the modules 302, 304, 306, thereby allowing communication with the readers and/or writers on the modules.

At least one of the modules is coupled to the beam 360 by one or more members 374. In the embodiment shown in FIGS. 3A-B, the outer modules 302, 306 are coupled to the beam 360 by the members 374. The members 374 extend into the apertures 364 in the upper surface 362 of the beam 360 and, when the assembly 300 is fully assembled, are immovably coupled to the beam 360.

Figure 3C:
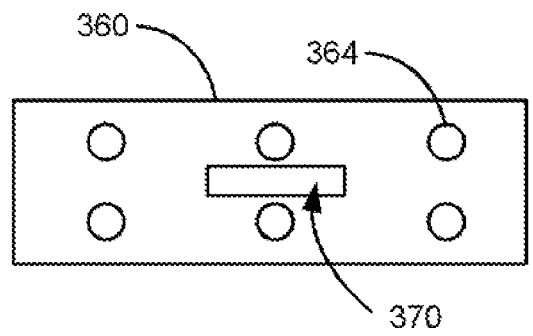
FIG. 3C a side view of a beam according to one embodiment.
Figure 3D:
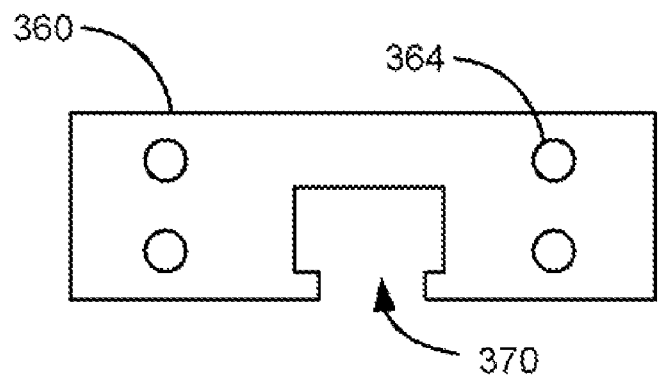
FIG. 3D a side view of a beam according to one embodiment.

In an alternate embodiment, the beam 360 may have a generally donut shape, as shown in FIG. 3C, a generally C-shape as shown in FIG. 3D, etc.

Referring again to FIG. 3A, it is seen that the members 374 elevate the modules associated therewith from the beam 360 for reasons which will soon become apparent.

As noted above, the internal wrap angles $\alpha_2$, $\alpha_3$ of the tape relative to the tape bearing surface 310 of the second module 304 are determined by the offset $\delta$ between the plane of the tape bearing surface 310 of the second module 304 and the planes of the tape bearing surfaces of the first and third modules 302, 306, respectively. Accordingly, the heights of the tape bearing surfaces of the various modules relative to each other should be precisely set. Thus, during assembly, a mechanism is used to set the relative positions of the modules. According to a generally preferred embodiment, one mechanism employs gauge pads. Referring to FIG. 3B, the outer modules 302, 306 each have gauge pads 376 coupled thereto. The gauge pads 376 are thin film gauge pads that may be used to set the proper offset of the aforementioned planes in the following manner.

Figure 3E:
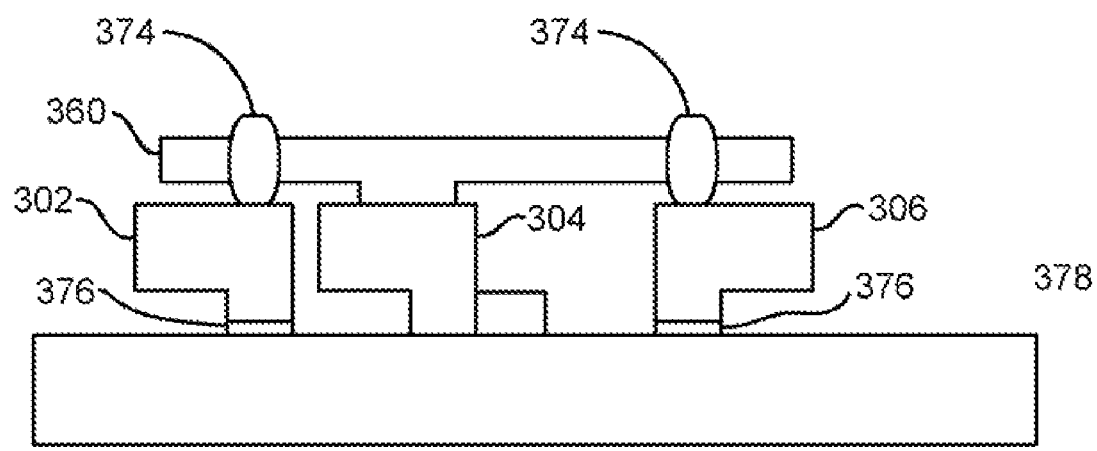
FIG. 3E a side view of a magnetic tape head with three modules during assembly according to one embodiment.

The gauge pads 376 are formed on the outer modules to a thickness about equal to the desired offset $\delta$ between the plane of the tape bearing surface 310 of the second module 304 and the planes of the tape bearing surfaces of the first and third modules 302, 306, respectively. The center module 304 is coupled to the beam. Then, as shown in FIG. 3E, the modules 302, 304, 306 are positioned on an optical flat 378 or other flat surface, with their tape bearing surfaces facing the optical flat 378. The optical flat is used to set the middle module 304 and the pads on the outer modules 302, 306 into a single plane. The gauge pads 376, having a thickness of about the desired offset δ, set the tape bearing surfaces of the various modules at the proper offset relative to each other within tolerances. One may verify that the tape bearing surface and/or gauge pads are flat on the optical flat 378 by performing visual inspections. Particularly, light fringes or "Newton's Rings" are typically seen if the surfaces are not in parallel contact. Note that such quality control procedure can also be performed using other well established methods and equipment.

A track to track alignment between the modules is also performed, i.e., the readers and/or writers of the various modules are aligned with each other, as well as gap-to-gap alignment.

Once the modules are properly positioned relative to the optical Oat 378, each other, and track to track positions of the readers and/or writers, the members 374 are inserted into the apertures of the beam, preferably by dropping them into apertures 364 that extend through the beam 360. The members 374 are then fixed in place via any desirable mechanism. For instance, an adhesive such as a UV-activated epoxy may be used to pot the members 374.

The gauge pads 376 are preferably positioned away from the transducers (readers and/or writers). Such positioning allows the assembly to be used without removing the gauge pads 376. Further, if the gauge pads 376 are removed, any residual material is away from the transducers. Thus, for example, the beam 360 or members 374 may be made of UV transparent material to facilitate curing.

Preferred materials from which to construct the gauge pads 376 include aluminum oxide, photoresist, or other material that can be removed or may wear off in use due to tape-induced erosion. The gauge pads 376 may be formed by vacuum deposition, patterning etc. In one approach, the gauge pads 376 may be added by masking out portions of the module except the pad sites, then depositing pad material and removing the mask.

An illustrative thickness of the gauge pads 376 is about 9±1 microns for a gap to gap spacing of about 0.75 mm, but could be higher or lower, depending on the particular variables of the system such as desired wrap angle, gap to gap spacing, etc.

In other embodiments, gauge pads are not used. Rather, some other type of spacer is used, such as a metal spacer, plastic spacer, etc. Alternatively, the spacer may be built as a step in an optical flat.

The beam 360 may be formed of any suitable material. Preferred materials include rigid ceramics such as AlTiC, aluminum oxide, BK-7 glass, etc. The beam may be of single construction, a laminate, etc.

The members 374 may be pre-coupled to the associated modules, or coupled to the modules after the modules are aligned. The members 374 may be constructed of any suitable material, such as the material from which the beam is formed, a plastic, a ceramic, a metal, etc. The members 374 may have a shape adapted to allow moderate rotation in the apertures, and preferably have a shape that minimizes the tendency to shift as the adhesive cures. One preferred shape of the members 374 is generally barrel shaped.

The number of members 374 implemented is not critical. As shown in FIG. 3B, a single beam 360 having eight members enables joining modules in a fashion that eliminates stresses that would otherwise tend to disrupt track-to-track and gap-to-gap alignments and tape bearing surface planar alignments. However, an embodiment having only two members, or even one member, per module is feasible.

The cable 350 or cables may be bonded to the associated module(s) prior to or after coupling the modules to the beam, though prior coupling of the cable(s) to the modules tends to simplify construction. Where each of the modules includes only readers or writers, the modules may be cabled using essentially dedicated read only or write only (plus servo) cables.

The outer wrap angles $\alpha_1$ are typically set in the drive, such as by rollers. For instance, rollers having an offset axis may be used to set the wrap angles. The offset axis creates an orbital arc of rotation, allowing precise alignment of the wrap angle $\alpha_1$.

Figure 4:
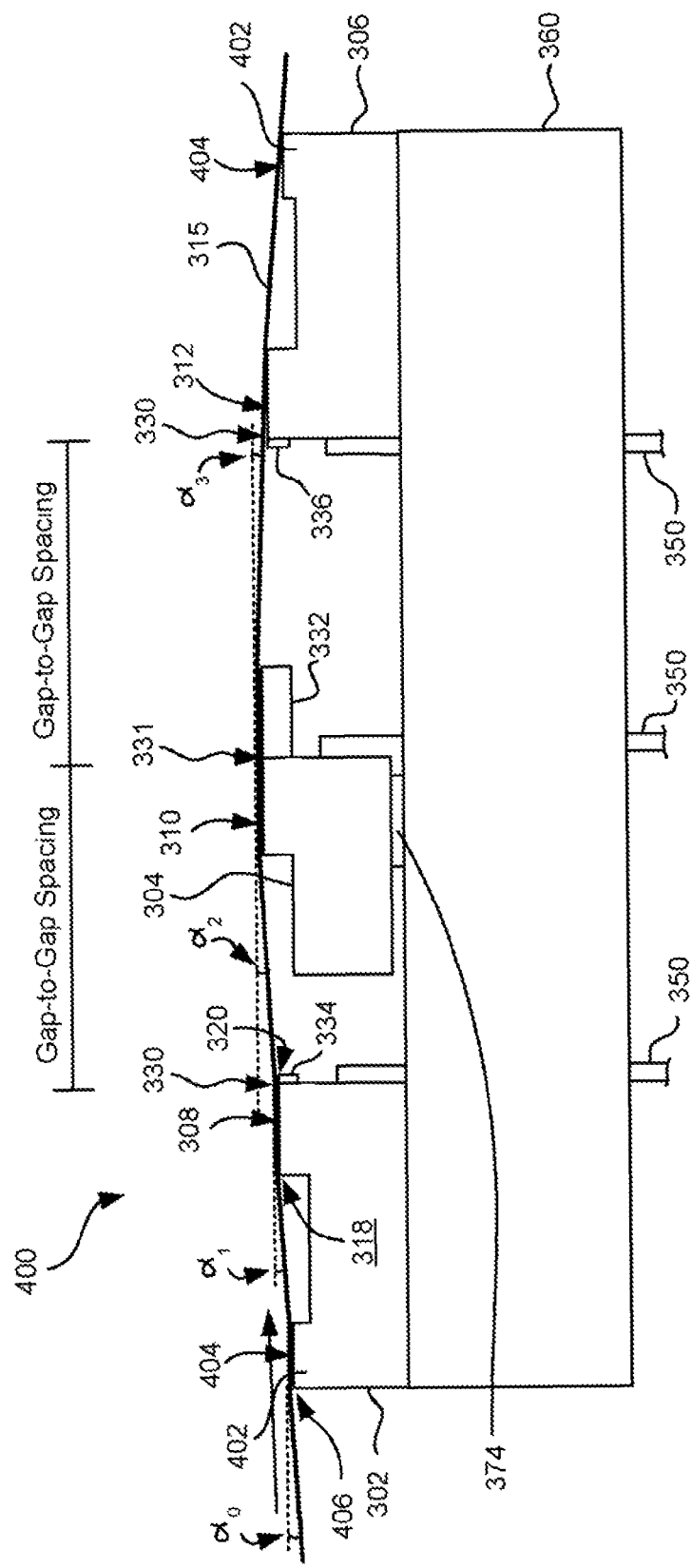
FIG. 4 is a side view of a magnetic tape head with three modules and outriggers on the outer modules.

The outer wrap angles can also be set by outriggers. FIG. 4 illustrates an embodiment 400 where outriggers 402 are formed on the outer modules 302, 306.

The outriggers 402 control the outer wrap angle $\alpha_1$ of the tape 315 relative to the tape bearing surfaces 308 of the leading module 302. As shown, each outrigger 402 may have a flat tape bearing surface 404 that, like typical flat profile heads, induces a small spacing between a tape 315 passing thereover and its tape bearing surface 404. The outrigger 402 may lie on a parallel plane as the tape bearing surface of the associated module. In such an embodiment, the outrigger tape bearing surface 404 is positioned below the plane of the tape bearing surface of the associated element, thereby creating the proper wrap angle $\alpha_1$ of the tape 315 relative to the tape bearing surface of the associated module.

A benefit of this embodiment is that, because the outrigger 402 may be formed directly on the module, the outer wrap angle $\alpha_1$ is always precisely set (just as the inner wrap angles $\alpha_2$ are fixed when the modules are coupled together).

While the outrigger 402 is preferably integrally formed on the associated module, alternatively, the outrigger 402 can be a separate piece mounted to the associated module, mounted in the drive, not directly coupled to the module but held in position relative thereto by mounting hardware in the drive, etc. As mentioned above, it is preferable that the outrigger 402 is fixedly coupled in relation to the associated module, so that the outer wrap angles $\alpha_1$ remain fixed regardless of initial outer wrap angle $\alpha_o$ of the tape approaching the outrigger 402.

By using an outrigger 402, the initial wrap angle $\alpha_o$ is less critical, and so greater tolerances are permitted. Particularly, tape wrap variations at the outer (skiving) edge 406 of the outrigger 402 do not change the internal wrap angle $\alpha_1$. A suggested initial wrap angle $\alpha_o$ for the outrigger 402 is 0.6°±0.5° or 0.7±0.5°, but can be as high as 2° or higher. The inventor has found that only a very slight initial wrap angle $\alpha_o$ (e.g., 0.1°) need be present in order to create the desired tacking down of the tape to the tape bearing surface of the outrigger. Wraps below 0.1 degrees have a higher risk of the tape popping off the outrigger 402, and wraps above 1.1 degrees may produce an undesirable stress level in the tape.

FIG. 4 also illustrates the case where the members 374 are used to set the height of the middle module 304. Again, gauge pads or other spacers on the outer modules may be employed to set the proper offset between the planes of the respective tape bearing surfaces of the modules 302, 304, 306, where, preferably, at least one of the two outer modules is also aligned using the members 374.

Figure 5A:
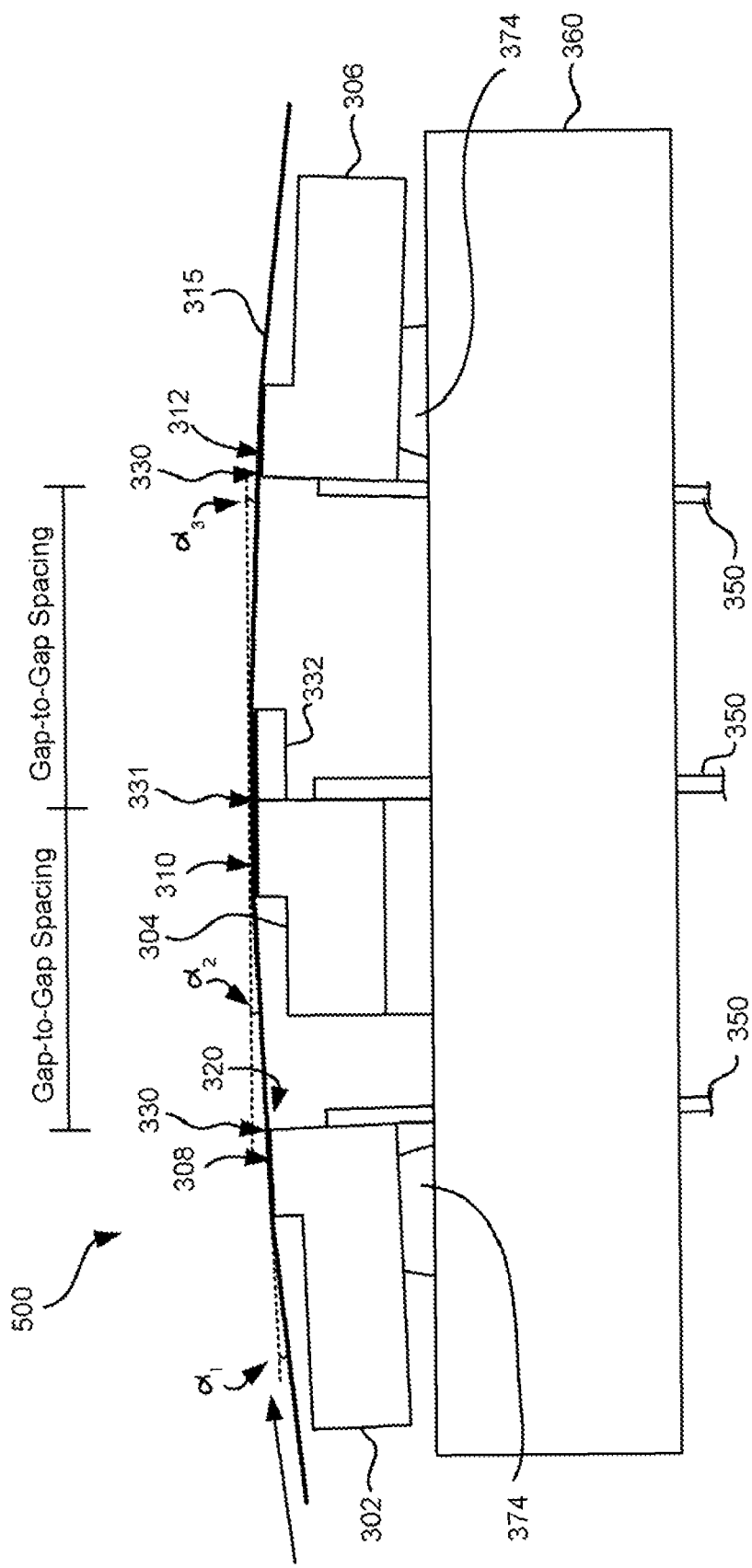
FIG. 5A is a side view of a magnetic tape head with three modules in a tangent (angled) configuration.

Depending on tape tension and stiffness, it may be desirable to angle the tape bearing surfaces of the outer modules relative to the tape beating surface of the second module. FIG. 5A illustrates an embodiment 500 where the modules 302, 304, 306 are in a tangent (angled) configuration Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The inventor has found that the tape will also pop off of the trailing module 306 in this embodiment, provided any overwrap on the tape bearing surface 312 of the trailing module 306 is less than 0.1°, thereby reducing wear on the elements in the trailing module 306. Members 374 having a barrel or other bulbous shape are preferred because then enable rotation thereof in the apertures of the beam 360. The faces of the members 374 may thus be in flat contact with the modules, which in this embodiment have parallel planar top and bottom surfaces.

Figure 5B:
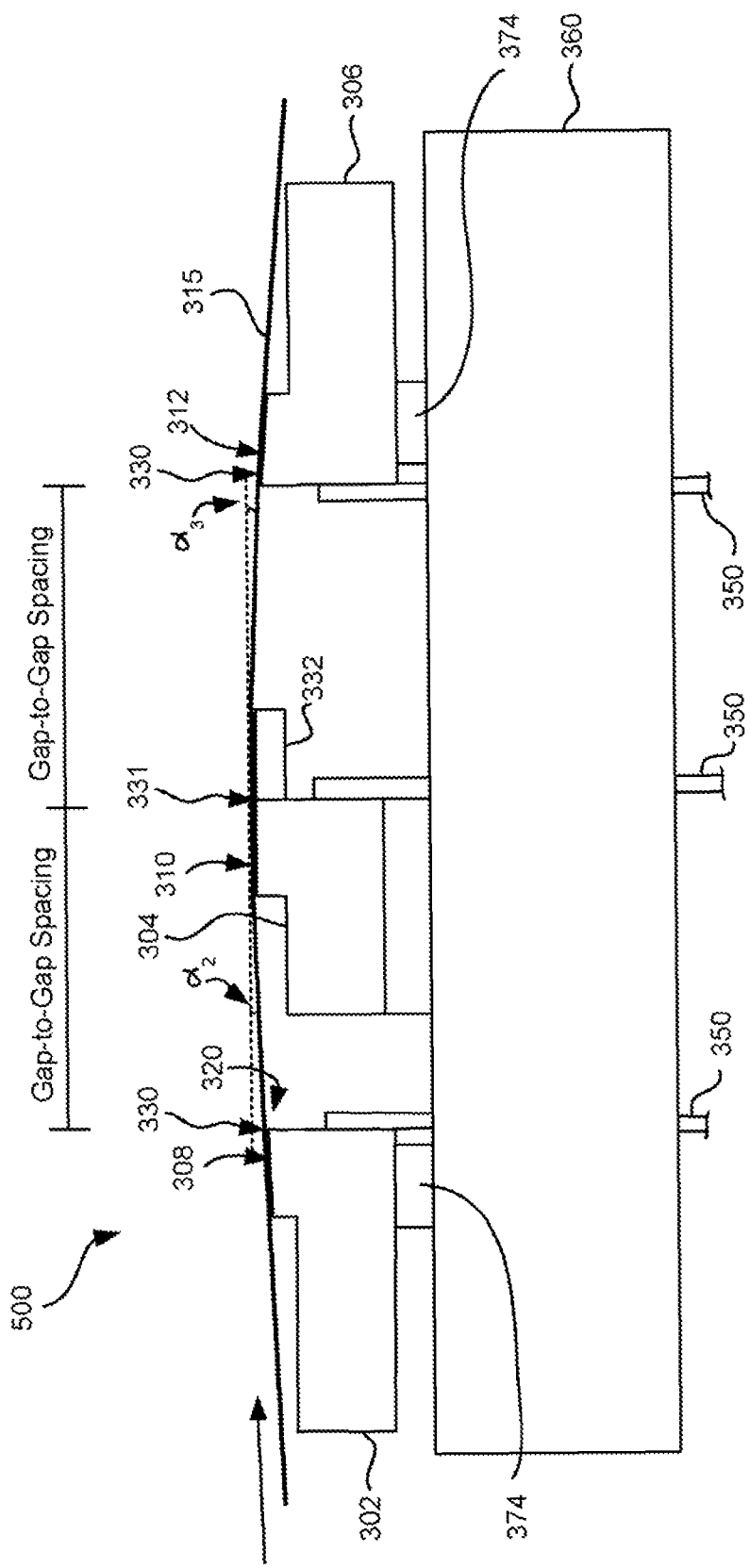
FIG. 5B is a side view of another magnetic tape head with three modules in a tangent (angled) configuration.

FIG. 5B illustrates another embodiment in which the outer modules 302, 306 are generally coplanar with the beam 360, and have tape bearing surfaces 308, 312 that are angled to provide a desired wrap angle $\alpha_2$ of the tape 315 relative to the second module 304. In this embodiment, the members 304 need not be barrel shaped. Further, the members may even include alignment features that assist in maintaining parallel-plane alignment of the modules. In another approach, an alignment apparatus such as the device described later may be used to align the modules.

These embodiments are especially useful for write-read-write applications. Additional aspects of these embodiments are similar to those given above.

Figure 6:
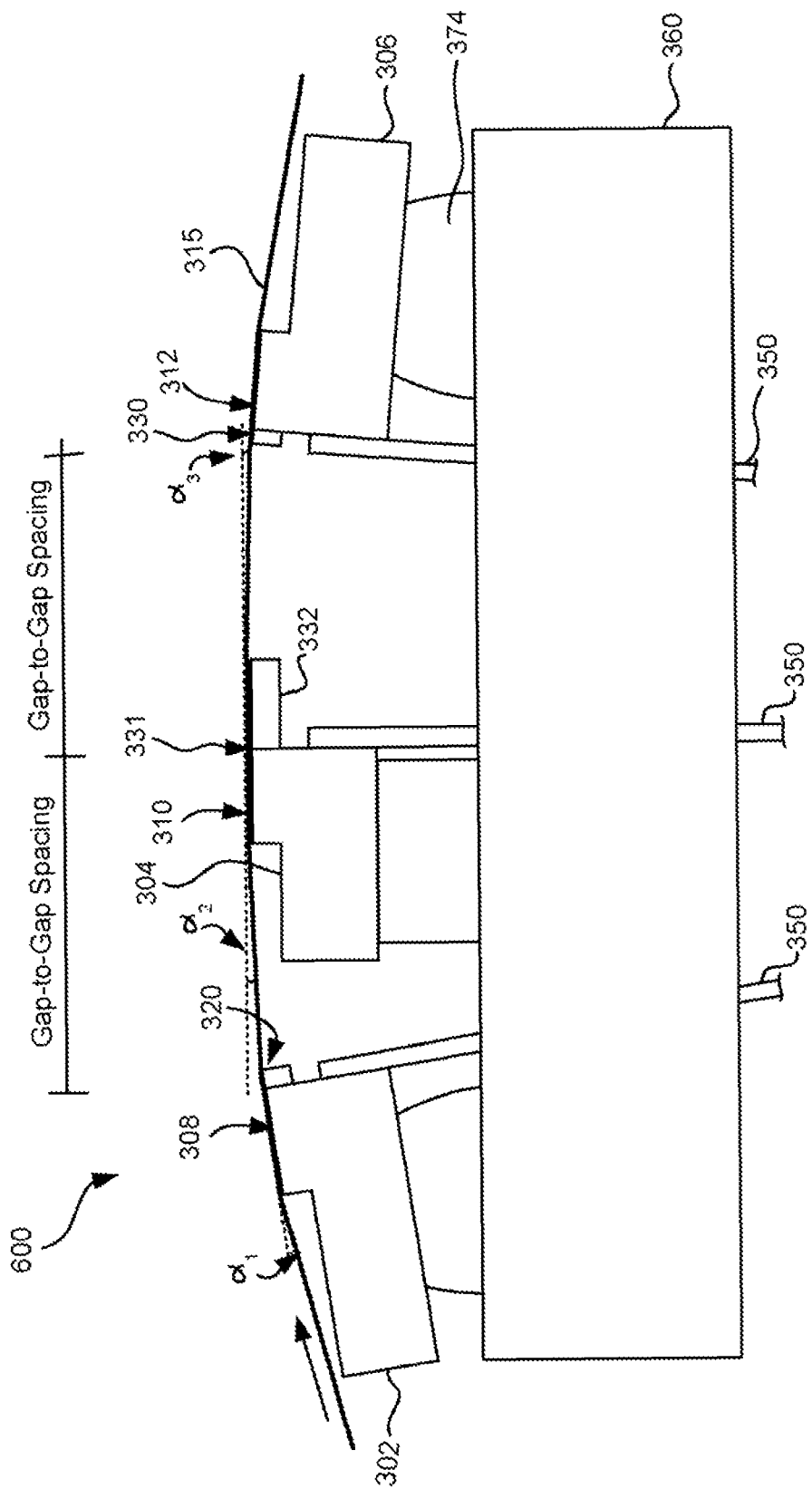
FIG. 6 is a side view of a magnetic tape head with three modules in an overwrap configuration.

FIG. 6 illustrates an embodiment 600 where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore the preferred embodiment has a write-read-write configuration, which may use shortened closures that thus allow closer gap-to-gap separation.

Figure 7:
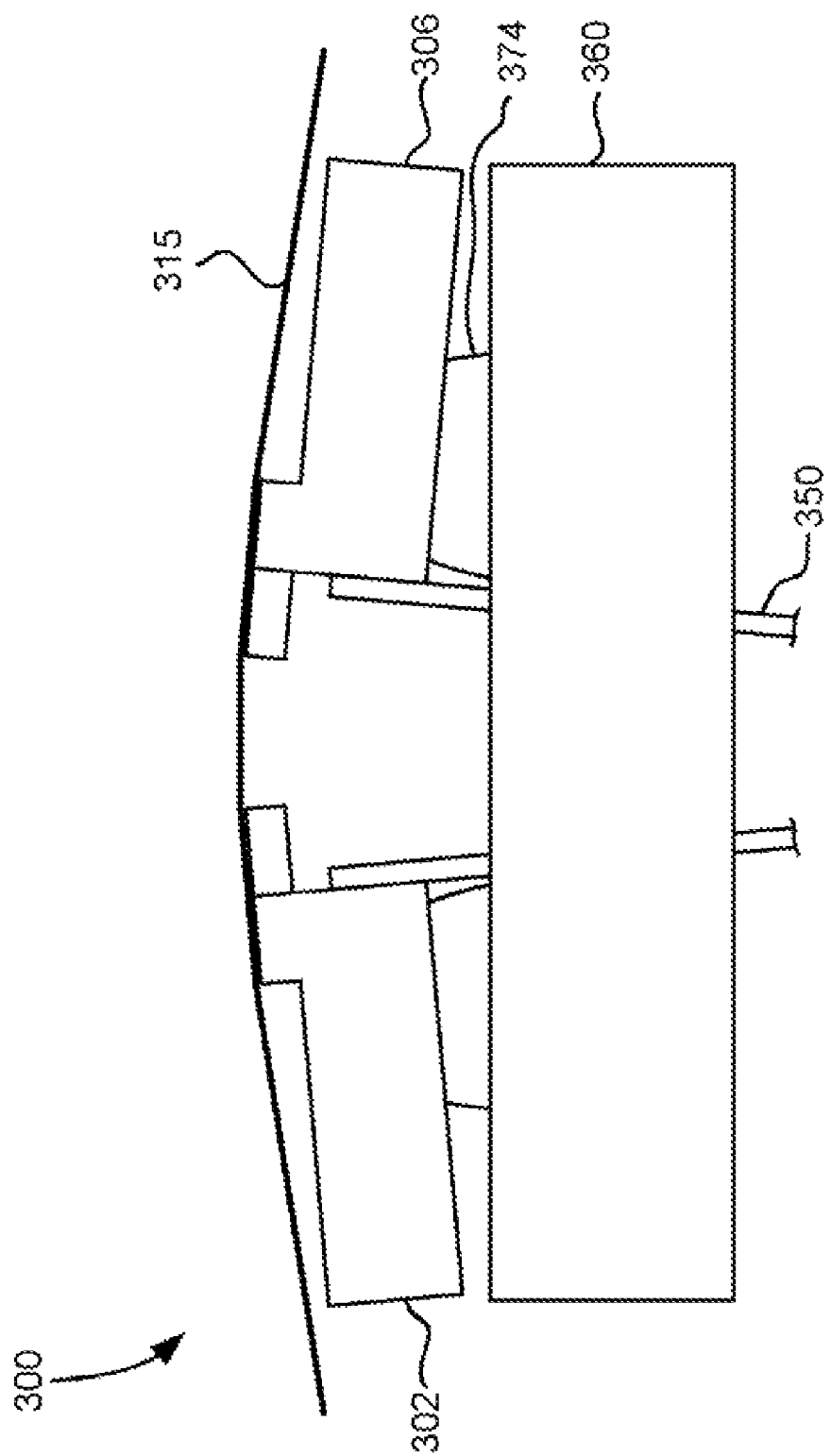
FIG. 7 is a side view of a magnetic tape head with two modules in a tangent (angled) configuration.

FIG. 7 illustrates a tape head assembly 300 having two modules 302, 306 coupled to a single beam 360 via member 374.

Additional aspects of the embodiments shown in FIGS. 5, 6 and 7 are similar to those given above.

Because the tape bearing surfaces of the modules 302, 304 306 lie along planes oriented at angles relative to each other, some mechanism other than, or in addition to, the optical flat may be used to set the relative orientations of the modules 302, 304 306. For instance.

Figure 8:
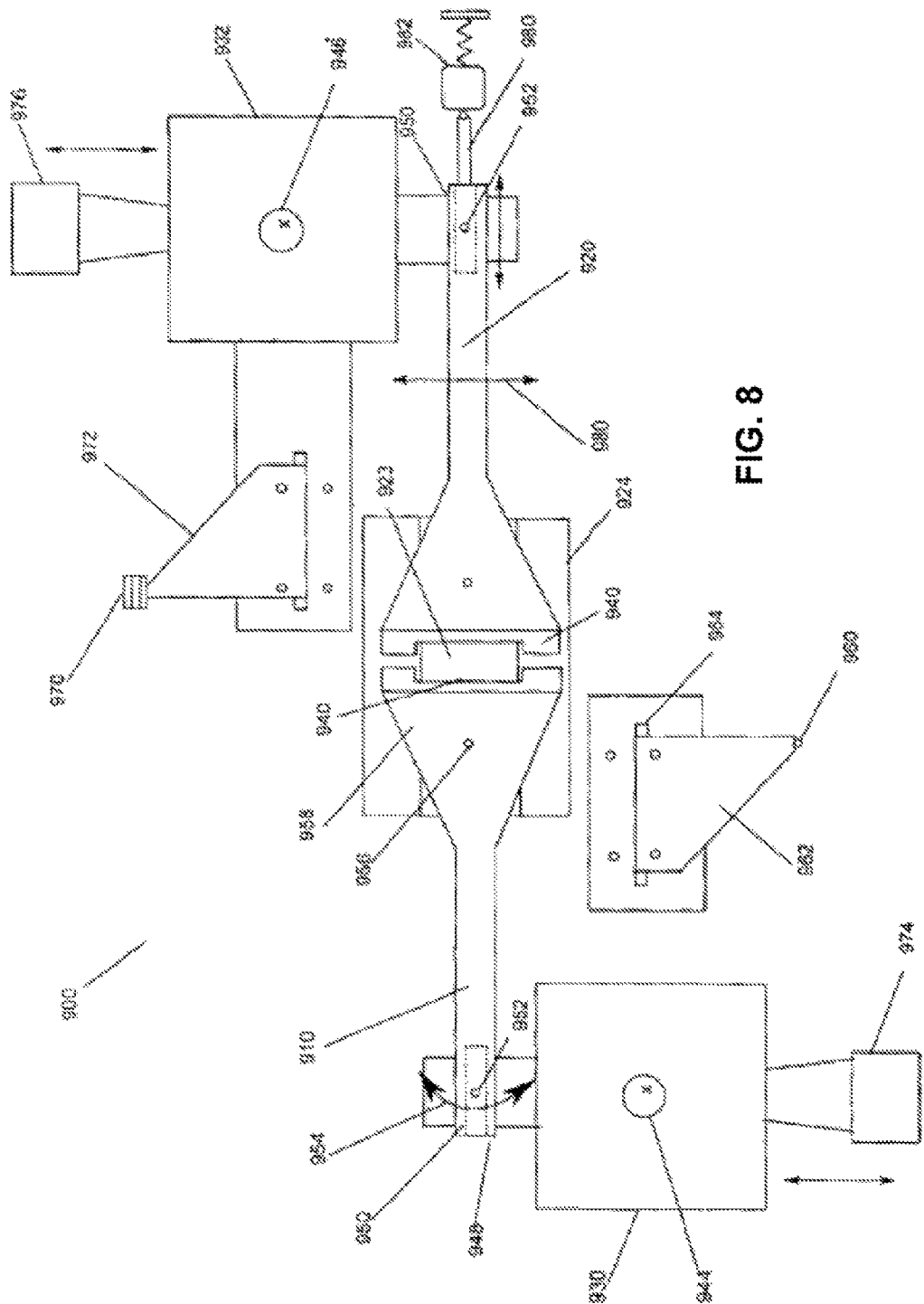
FIG. 8 illustrates a tape head module assembly system.

FIG. 8 illustrates a tape head module assembly system according to one embodiment. FIG. 8 illustrates two module holders 910, 920 disposed over an opening 923 with modules 940 disposed on a hard, flat surface 924 such as an optical flat. Preferably the hard flat surface 924 is transparent e.g., glass or sapphire. Motion stages 930, 932 provide micron level controlled motion to the module holders 910, 920 relative to one another. For example, four or more stages may be provided for controlled motion of the modules relative to one another.

The module holders 910, 920 are preferably mechanical devices. However, the module holders 910, 920 may alternatively be vacuum devices or devices that use a temporary adhesive. The flat air-bearing, tape contact surfaces of each module 940 rest on the glass 924, typically with the force of gravity acting down on the modules and the holders, which may be weighted accordingly.

The tape wrap angle between the two modules is then set by first establishing planarity with the transparent surface using optical fringes, then lifting the opposite end of each module holder a prescribed amount. This is performed by rotating height adjusters 944, 946 to change the height of the rear end 948 of the module holders 910, 920. For example, the rear 948 of each module holder 910, 920 may be equipped with a smooth, surface-hardened groove 950. A sapphire or other hard, low friction ball 952 may engage the slot. Actuator 944, 946 may be used to lift the ball 952. As the ball 952 lifts, the ball 952 is free to slip in the groove 950 to provide the proper alignment. The remaining module holder motions are constrained.

A first module 910 can only rotate 954 in the horizontal plane by adjusting control 974. This constraint is achieved by providing a sapphire bail 956 on the module end 958 of the holder 910, just above the module 940. This ball 956 engages a fixed, smooth, hardened socket 960. The socket 960 is mounted on a plate 962 that is tree to pivot 964 about a fixed axis that is outboard of the longitudinal axis of the module holder 910, and so provides an anchor 960, 962 that accommodates various bail heights. The second module holder 920 can only slide along the original longitudinal axis of the holder via the slot 950 in the rear of module holder 920 and slot 970 in plate 972, and can only be translated laterally 980 in a direction orthogonal to this by adjusting control 976. The second module holder 920 includes a sapphire ball 980 that is engaged by a spring-loaded stage 982 that urges the second module holder 920 toward the first module holder 910.

The next adjustment consists of aligning the module that can only rotate so that the gaps between the two modules are parallel to within 1-2 microns or better. The final adjustment consists of translating the second module 920 laterally 980 until fiducial marks that ensure reader-opposite-writer track-to-track registration are aligned to within 1-2 microns.

The modules 940 may be as described above. After alignment, the modules 940 are coupled to the beam, as described above.

Using this system, sophisticated measurement systems for determining the module starting orientations relative to one another are not needed. In addition the modules can be preloaded into the mechanical carriers in an offline process for higher throughput. Finally, with automation, this can be implemented into manufacturing with a minimum of operator training. The tape head module assembly system and method hold the parts securely in fixtures that are aligned, giving significantly greater tolerance control.

FIG. 9A illustrates a side view 1000 of the two module holders according to the present invention. Each of the module holders includes an arm 1002 having a grasping structure 1004 and an opposable piece 1006, e.g. a spring loaded clasp, forming a jaw 1008. The module 1040 is secured between the grasping structure 1004 and an opposable piece 1006. The two module holders 1010, 1020 are positioned on the surface 1014 of the tape head module assembly system. The ends 1016, 1018 of the two module holders 1010, 1020 that hold the module 1040, including beams and tape heads, are placed at a clear surface 1024, e.g., glass or sapphire, with the ends 1016, 1018 of the two module holders 1010, 1020 that hold the modules 1040 facing each other.

FIG. 9B shows the jaws 1008 of the two module holders 1010, 1020 straddle the clear surface 1024 so that the flat tape head modules 1040 sit on the clear surface 1024 to allow optical fringe measurements between the modules 1040 and the hard transparent surface 1024 to be made.

An actuator may be used to lift the shaft 1090. As can be seen, the opposite end of each module holder 1010, 1020 may be lifted a prescribed amount because the rear of each module holder may be equipped with a smooth, surface-hardened groove 1050. A sapphire or other hard, low friction ball on shaft 1090 may engage the slot 1050. As the shaft 1090 lifts, the ball on the shaft 1090 is free to slip in the groove 1050 to provide the proper alignment of the modules 1040 as shown in FIG. 9C. In addition, a sapphire ball 1056 is disposed on the module end of the holder 1010, 1020 for rotational alignment of module 1010 and longitudinal alignment of module 1020 as described above.

Figure 10:
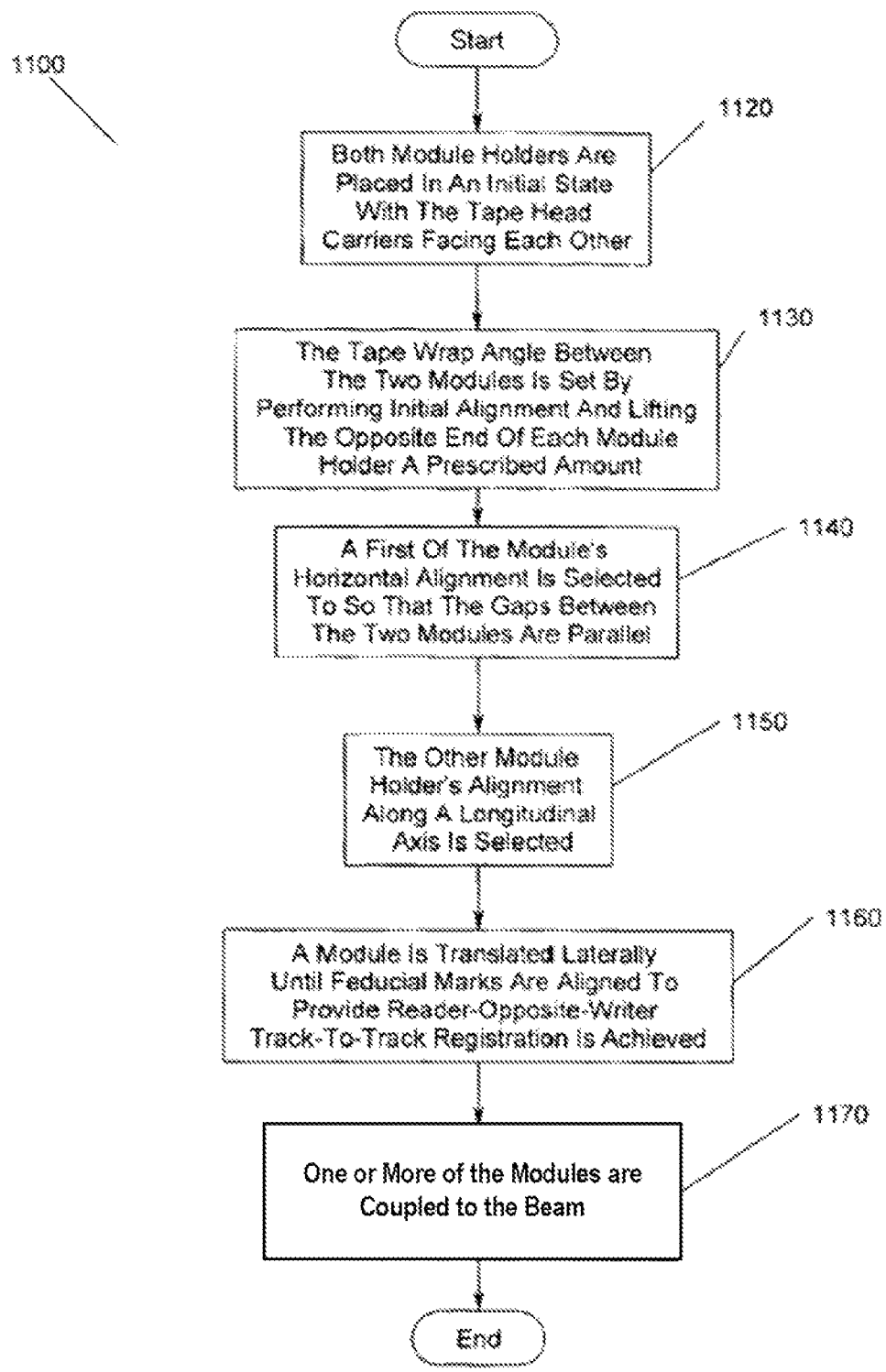
FIG. 10 is a flow chart of a tape head module assembly method.

FIG. 10 is a flow chart 1100 of the tape head module assembly method according to the present invention. Both module holders are placed in an initial state with the tape head carriers facing each other 1120. The tape wrap angle between the two modules is set by performing initial alignment and lifting the opposite end of each module holder a prescribed amount 1130. A first module's horizontal alignment is selected to so that the gaps between the two modules are parallel 1140. The other module holder's alignment along a longitudinal axis is selected 1150. A module is translated laterally until fiducial marks are aligned to provide reader-opposite-writer track-to-track registration 1160. One or more of the modules may then be joined to the beam using an adhesive.

Figure 11:
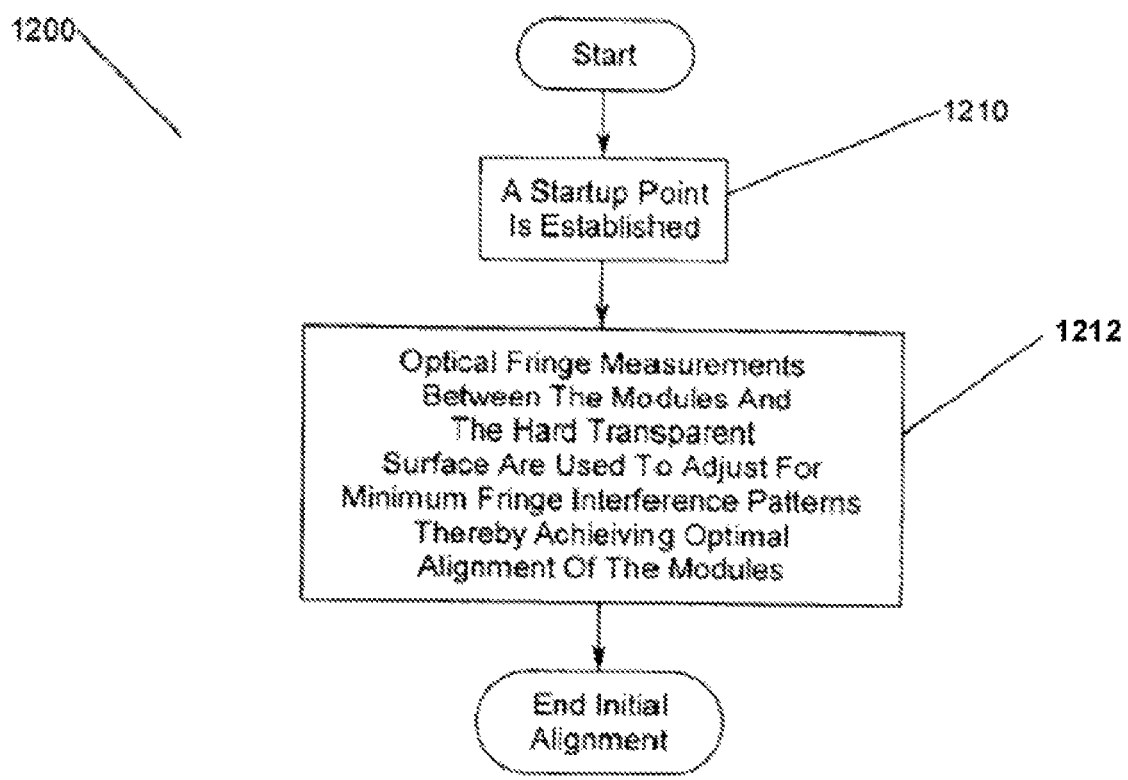
FIG. 11 is a flow chart of an initial alignment process.

FIG. 11 is a flow chart 1200 of the initial alignment process. First, a startup point is established 1210. Then, optical fringe measurements between the modules and the hard transparent surface are used to adjust for minimum fringe interference patterns thereby achieving optimal alignment of the modules 1212.

Figure 12:
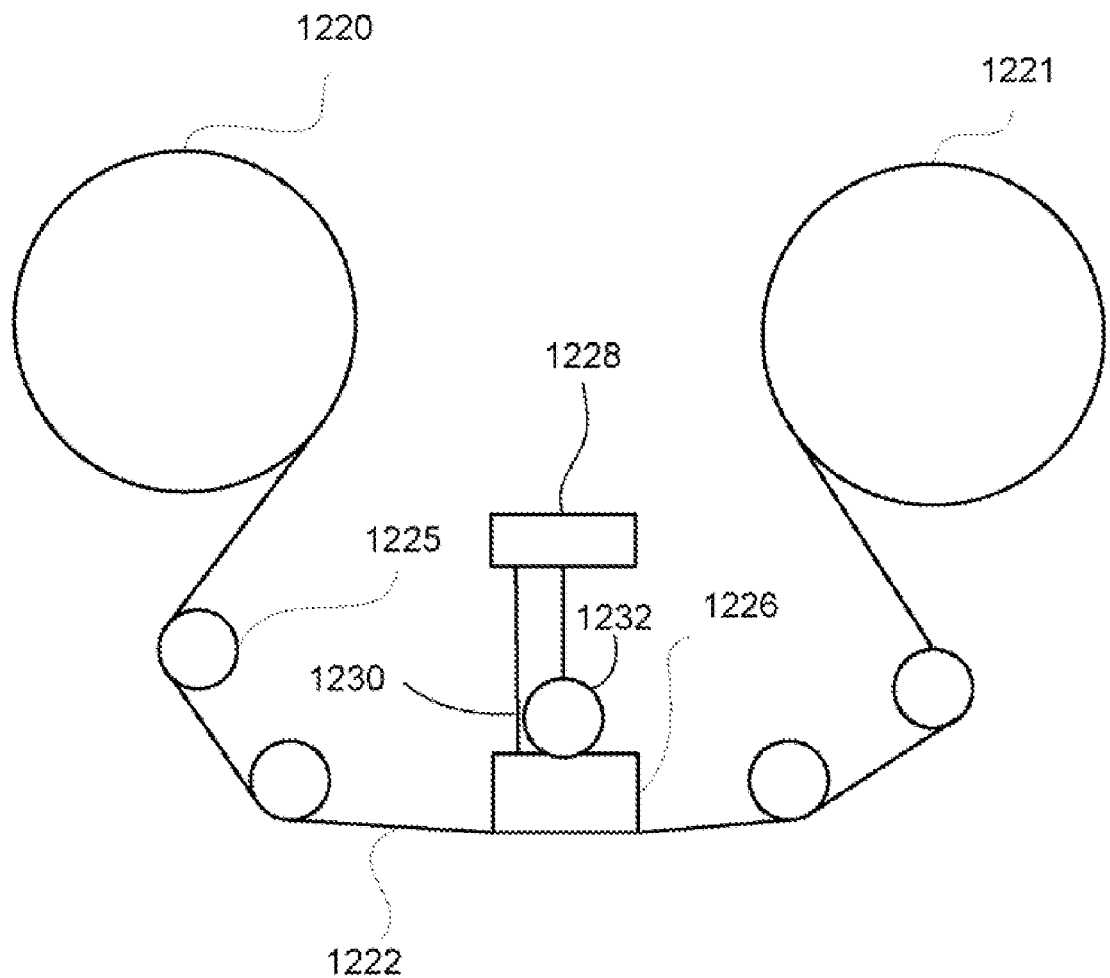
FIG. 12 is a schematic diagram of the tape drive system.

FIG. 12 illustrates a simplified tape drive which may be employed in the context of the present invention. While one specific implementation of a tape drive is shown in FIG. 12, it should be noted that the embodiments of the previous figures may be implemented in the context of any type of tape drive system.

As shown, a tape supply cartridge 1220 and a take-up reel 1221 are provided to support a tape 1222. These may form part of a removable cassette and are not necessarily part of the system. Guides 1225 guide the tape 1222 across a preferably bidirectional tape head 1226, of the type disclosed herein. Such tape head 1226 is in turn coupled to a controller assembly 1228 via a write-read cable 1230. The controller 1228, in turn, controls head functions such as servo following, writing, reading, etc. An actuator 1232 controls position of the head 1226 relative to the tape 1222.

A tape drive, such as that illustrated in FIG. 12, includes drive motor(s) to drive the tape supply cartridge 1220 and the take-up reel 1221 to move the tape 1222 linearly over the head 1226. The tape drive also includes a read/write channel to transmit data to the head 1226 to be recorded on the tape 1222 and to receive data read by the head 1226 from the tape 1222. An interface is also provided for communication between the tape drive and a host (integral or external) to send and receive the data and for controlling the operation of the tape drive and communicating the status of the tape drive to the host, all as will be understood by those of skill in the art.

According to one embodiment of the present invention, a method for writing data to a magnetic tape using a head as describe above includes sending signals to writers on a first module having a flat profile tape bearing surface when the first module is a leading module with respect to a direction of tape travel. Signals from readers are received on a second module having a flat profile tape bearing surface either during writing (read while write) or in readback mode only. Signals are sent to writers on a third module having a flat profile tape bearing surface when the third module is a leading module with respect to a direction of tape travel.

Some embodiments of the present invention can take the form of an entirely hardware embodiment, other embodiments; of the invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The various embodiments described herein, or portions thereof, can be used separately or in combination with one another. The embodiments described herein may be used in combination with coated heads.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape head assembly, comprising:
   a single beam having an upper surface and a plurality of apertures into the upper surface, the beam defining a void positioned towards an inner portion thereof, the void being for receiving a cable;

multiple modules coupled to the beam, at least one of the modules being coupled to the beam by members, the members extending into the apertures in the upper surface of the beam and being immovably coupled to the beam, each of the modules having at least one of readers for reading from a magnetic medium and writers for writing to a magnetic medium, wherein the members elevate the at least one of the modules from the beam thereby defining a gap between the beam and the at least one of the modules, the gap surrounding each of the members in an area directly between the beam and the at least one of the modules.

2. The assembly as recited in claim 1, wherein two modules are coupled to the beam by the members, wherein a point of the immovable coupling of each of the members is in the apertures of the beam.

3. The assembly as recited in claim 1, wherein more than two modules are coupled to the beam by the members.

4. The assembly as recited in claim 1, wherein each of the modules has a flat tape bearing surface.

5. The assembly as recited in claim 1, wherein the beam has a generally U-shape.

6. The assembly as recited in claim 1, wherein the beam has a generally donut shape.

7. The assembly as recited in claim 1, wherein the members have a generally barrel shape, wherein the members have a greater cross-sectional diameter at a central portion thereof than at ends thereof, the cross-sectional diameters of the members being oriented perpendicular to an axis of the associated member.

8. The assembly as recited in claim 1, wherein tape bearing surfaces of at least two of the modules each lie along or intersect a different plane, the planes being parallel and offset from one another, and further comprising gauge pads or spacers coupled to at least one of the modules, the gauge pads or spacers each having a thickness about equal to the offset between the parallel planes.

9. The assembly as recited in claim 1, wherein the apertures extend completely through the beam.

10. The assembly as recited in claim 1, wherein the modules each have a tape bearing surface, wherein the tape bearing surfaces lie along parallel planes.

11. The assembly as recited in claim 1, wherein the modules each have a tape bearing surface, wherein the tape bearing surfaces lie along planes oriented at angles relative to each other.

12. The assembly as recited in claim 1, further comprising gauge pads or spacers coupled to at least one of the modules, the gauge pads or spacers each having a thickness about equal to an offset between a plane of a tape bearing surface of one of the modules and a plane of a tape bearing surface of another of the modules.

13. A tape drive system, comprising:
a tape head assembly as recited in claim 1;
a drive mechanism for passing a magnetic recording tape over the head; and
a controller in communication with the head.

14. A tape head assembly, comprising:
a single beam;
a first module coupled to the beam;
a third module coupled to the beam and aligned with the first module in a direction of tape travel; and
a second module coupled to the beam at a position between the first and third modules and aligned therewith in a direction of tape travel,
the first and third modules being coupled to the beam by members,
the members extending into apertures in the beam and being immovably coupled to the beam,
wherein the members elevate the first and third modules from the beam thereby creating a gap between the beam and the modules, the gap surrounding each of the members in an area directly between the beam and the associated module.

15. The assembly as recited in claim 14, wherein each of the modules has a flat tape bearing surface, wherein a point of the immovable coupling of each of the members is in the apertures of the beam.

16. The assembly as recited in claim 14, further comprising gauge pads or spacers coupled to at least one of the modules, the gauge pads or spacers each having a thickness about equal to an offset between a plane of a tape bearing surface of one of the modules and a plane of a tape bearing surface of another of the modules.

17. The assembly as recited in claim 14, wherein the apertures extend completely through the beam, wherein the members have a generally barrel shape, wherein the members have a greater cross-sectional diameter at a central portion thereof than at ends thereof, the cross-sectional diameters of the members being oriented perpendicular to an axis of the associated member.

18. The assembly as recited in claim 14, wherein the modules each have a tape bearing surface, wherein the tape bearing surfaces lie along parallel planes.

19. The assembly as recited in claim 14, wherein the modules each have a tape bearing surface, wherein the tape bearing surfaces lie along planes oriented at angles relative to each other.

20. A tape head assembly, comprising:
a single beam;
a first module coupled to the beam;
a third module coupled to the beam; and
a second module coupled to the beam at a position between the first and third modules,
the second module being coupled to the beam by members, the members extending into the beam and being immovably coupled to the beam wherein the members elevate the second module from the beam thereby creating a gap between the beam and the second module, the gap surrounding each of the members in an area directly between the beam and the second module.

* * * * *